United States Patent
Tsuge et al.

(10) Patent No.: US 7,839,857 B2
(45) Date of Patent: *Nov. 23, 2010

(54) PACKET FORWARDING APPARATUS WITH FUNCTION OF LIMITING THE NUMBER OF USER TERMINALS TO BE CONNECTED TO ISP

(75) Inventors: Munetoshi Tsuge, Sagamihara (JP); Ryo Nakamura, Yokohama (JP); Toshiyuki Saito, Yokohama (JP); Yasunari Shinohara, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 452 days.

This patent is subject to a terminal disclaimer.

(21) Appl. No.: 11/905,444

(22) Filed: Oct. 1, 2007

(65) Prior Publication Data

US 2008/0075085 A1   Mar. 27, 2008

Related U.S. Application Data

(63) Continuation of application No. 11/362,218, filed on Feb. 27, 2006, now Pat. No. 7,286,539.

(30) Foreign Application Priority Data

Dec. 12, 2005   (JP) .............................. 2005-357714

(51) Int. Cl.
  H04L 12/28 (2006.01)
(52) U.S. Cl. ...................................... 370/392; 370/389
(58) Field of Classification Search ................. 370/359, 370/389, 31, 5, 392, 401, 395, 52, 402, 428, 370/465, 393, 396
  See application file for complete search history.

(56) References Cited

U.S. PATENT DOCUMENTS

| 6,778,528 | B1 | 8/2004 | Blair et al. |
| 6,886,103 | B1 | 4/2005 | Brustoloni et al. |
| 7,107,348 | B2 | 9/2006 | Shimada et al. |
| 7,286,539 | B2 * | 10/2007 | Tsuge et al. ................. 370/392 |

FOREIGN PATENT DOCUMENTS

| JP | 2000-112852 | 10/1998 |
| JP | 2000-252993 | 2/1999 |

(Continued)

OTHER PUBLICATIONS

JPO Office Action dated Feb. 19, 2008, in Japanese.
International Search Report Dated Sep. 9, 2003.
Office Action from Japanese Patent Office for Japanese App 2008-006745 mailed Jul. 27, 2010, and translated claims.

Primary Examiner—Brenda Pham
(74) Attorney, Agent, or Firm—Stites & Harbison, PLLC; Juan Carlos A. Marquez, Esq

(57) ABSTRACT

A packet forwarding apparatus for connecting a plurality of user terminals to an ISP management server has a management table indicating the relationship between a connection port identifier and specific header information in association with the MAC address of each of the user terminals so that, in a communication protocol procedure executed between each of the user terminals and the ISP management server prior to communication with a wide-area network, the packet forwarding apparatus discards a packet for the user terminal when it is determined that the specific header information cannot be assigned to the user terminal based on the management table.

11 Claims, 14 Drawing Sheets

FOREIGN PATENT DOCUMENTS

| | | |
|---|---|---|
| JP | 2001-103086 | 9/1999 |
| JP | 2000-112852 | 4/2000 |
| JP | 2003-60675 | 8/2001 |
| JP | 2003-124957 | 10/2001 |
| JP | 2003-258935 | 3/2002 |
| JP | 2005-217661 | 1/2004 |
| JP | 2005-064936 | 3/2005 |
| WO | WO 2004/107671 A1 | 5/2003 |

* cited by examiner

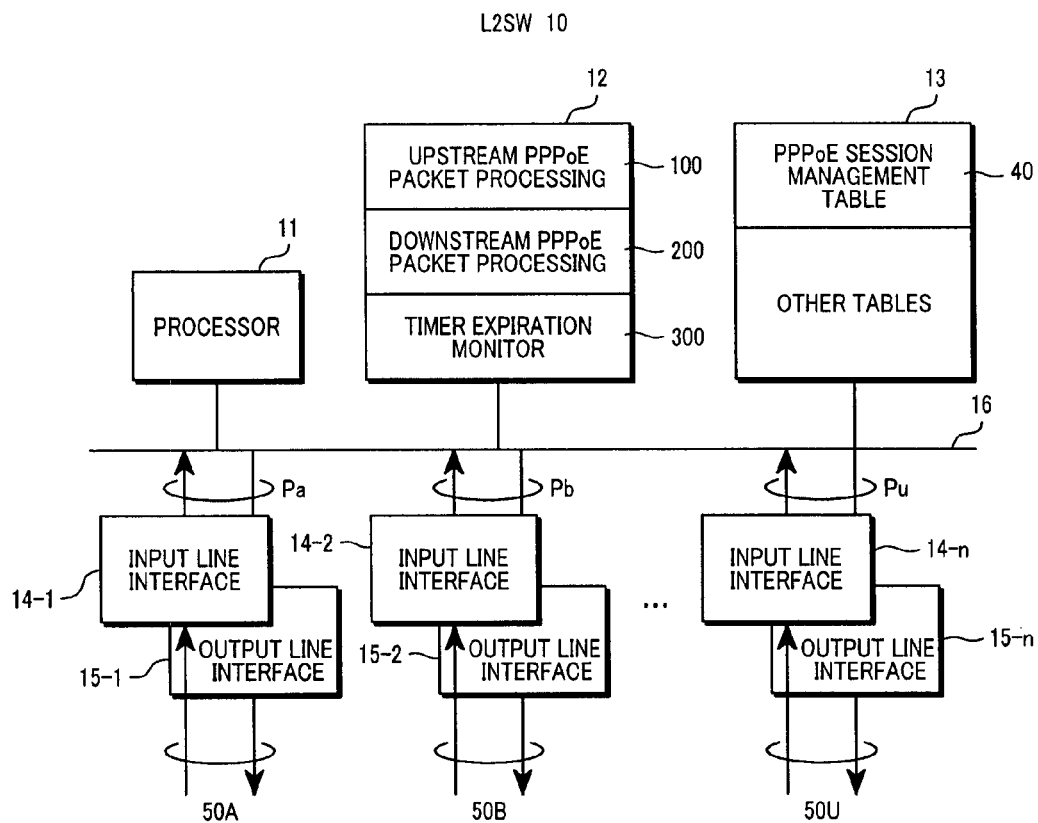

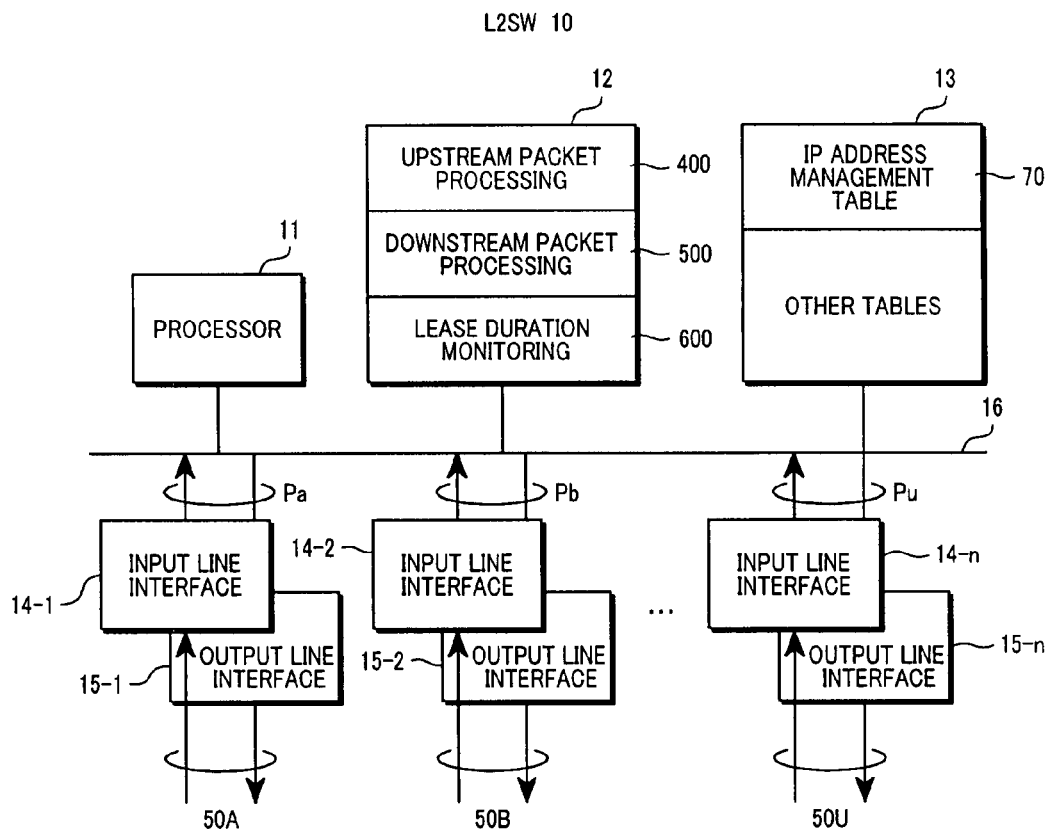

PACKET FORWARDING APPARATUS WITH FUNCTION OF LIMITING THE NUMBER OF USER TERMINALS TO BE CONNECTED TO ISP

CROSS REFERENCE TO RELATED APPLICATIONS

This application is a Continuation of nonprovisional U.S. application Ser. No. 11/362,218 filed on Feb. 27, 2006 now U.S. Pat. No.7,286,539, which claims the priority of Japanese Application No. 2005-357714, filed on Dec. 12, 2005. Priority is claimed based on U.S. application Ser. No. 11/362,218 filed on Feb. 27, 2006, which claims the priority of Japanese Application No. 2005-357714, filed on Dec. 12, 2005, all of which is incorporated by reference.

BACKGROUND OF THE INVENTION (1) Field of the Invention

The present invention relates to a packet forwarding apparatus and, more particularly, to a packet forwarding apparatus with the function of limiting the number of user terminals to be connected to an ISP (Internet Service Provider) in an access network connected to the Internet as a wide-area network.

(2) Description of Related Art

With the tendency toward a broader-band access line from a user terminal to the Internet, and with the prevalence of various home electrical products equipped with network functions, there have been increasing requests from users to simultaneously connect a plurality of terminals owned by a single user, to the management server of an ISP (Internet Service Provider). The term "single user" used herein means a user or subscriber who has personally signed up for an Internet connection service provided by an ISP and commonly indicates an individual household connected to the ISP via an access line.

To connect user terminals to the Internet, it is necessary to assign IP (Internet Protocol) addresses to the individual user terminals. The assignment of the IP addresses is typically performed in accordance with a communication protocol such as the DHCP (Dynamic Host Configuration Protocol) or the PPPoE (Point-to-Point Protocol over Ethernet).

The DHCP is a communication protocol for dynamically assigning, when any of the user terminals is connected to a Layer-2 sub-network, an IP address which is proper for a terminal on the sub-network to the user terminal. On the other hand, the PPPoE is a communication protocol for connecting a point-to-point virtual Layer-2 session (PPPoE session) on the Ethernet™ between a BAS (Broadband Access Server) belonging to each ISP and any of the user terminals. In this case, an IP address is assigned to the user terminal via the PPPoE session in accordance with the PPP (Point-to-Point Protocol).

When a single user owns a plurality of terminals, each of the user terminals takes either of a connection form in which the user terminal is connected to an access network via, e.g., a home router (Layer-3 packet repeater) placed at the user's home and a connection form in which the user terminal is connected to an access network via a hub as a Layer-2 packet forwarding apparatus. In the DHCP or PPPoE, a client to which the management server of an ISP assigns an IP address is the home router in the former connection form, while it is an individual user terminal in the latter connection form.

For example, when the DHCP is applied, an IP address is assigned only to the home router in the former connection form, while different IP addresses are individually assigned to the plurality of terminals owned by the user in the latter connection form. When the PPPoE is applied to the latter connection form, the plurality of terminals owned by the user are allowed to be individually connected to PPPoE sessions. In a communication environment to which the PPPoE is applied, there are cases where one client device (user terminal or home router) requires a plurality of PPPoE sessions, for example, when a client uses multiple PPPoE sessions for different services or when the same client wishes to connect to a plurality of different ISPs.

Thus, the number of IP addresses assigned by an ISP to each user and the number of PPPoE sessions to be connected to the same user are differ depending on conditions such as the number of terminals owned by the same user, the presence or absence of a home router, and the type of a service the user wishes to use. However, if requests for IP address assignment and requests for PPPoE session connection are accepted without limitation from each user, a load on a BAS or the DHCP server as the management server of an ISP increases. In addition, if a specific user uses a large number of IP addresses, a communication service to be shared among users becomes partial due to the occupation of communication resources. Therefore, it is necessary to limit the number of assignable IP addresses and the number of simultaneously connectable sessions for each of the users.

For example, in the case of adopting a network configuration in which each of user terminals and the management server (DHCP server or BAS) of an ISP are connected by an individual access line (physical line or logical line such as a VLAN: Virtual Local Area Network) on a per user basis, the number of assigned IP addresses and the number of connections for each user can be limited by controlling the number of assigned IP addresses and the number of sessions for each access line at the management server.

However, in a network configuration having a Layer-2 switch (L2SW) disposed between individual access lines to which user terminals are connected and a management server such that the traffic of a plurality of users is concentrated by the L2SWs to a single access line and forwarded to the management server, the management server cannot identify the individual access lines on a user-by-user basis. In this case, it becomes impossible for the management server to limit the number of assigned IP addresses and the number of connected sessions for each user.

As examples of a prior art technology for limiting the number of assigned IP addresses and the number of connected sessions for each user in an access network configuration to which the L2SW mentioned above has been applied, there have been known the following technique.

(1) The first technique associates the management server (DHCP server or BAS) of an ISP and an L2SW with each other so that, when receiving a session-connection request packet or an IP-address-assignment request packet from a user terminal, the L2SW notifies the management server of identification information of the access line from which the request packet has been received.

(2) The second technique stores the number of already assigned IP addresses and the number of currently connected sessions in an authentication server on a user-by-user basis so that when user authentication is performed in association with a session connection procedure, the authentication server can reject a new session connection request from a user of which these numbers have reached maximum values.

As an example of a known document which describes the first technique (1) in a communication environment to which the DHCP has been applied, there is Japanese Unexamined Patent Publication No. 2000-112852.

SUMMARY OF THE INVENTION

However, each of the conventional technique (1) and (2) described above is applied to the management server, e.g., DHCP server, BAS, or authentication server, belonging to the ISP and does not limit the number of assigned IP addresses and the number of connected sessions for each user by using the L2SWs alone. Because the technique (1) assumes the association between the L2SW and the management server, it becomes useless in the case where the L2SW is operated by a business entity independent of the ISP to which the management server belongs and an associative operation between the L2SW and the management server, e.g., the notification of the identification information of the access line cannot be guaranteed.

In addition, each of the conventional technique (1) and (2) has the problem that a load resulting from a processing for limiting connected user terminals is localized to the management server since a plurality of L2SWs are connected to the management server of the ISP and the management server receives session connection requests and IP address assignment requests from a large number of user terminals via the L2SWs.

An object of the present invention is to provide a packet forwarding apparatus (L2SW) capable of limiting the number of assigned IP addresses and the number of PPPoE sessions for each user by reducing a load on the management server of an ISP.

To attain the object, a packet forwarding apparatus according to the present invention comprises a plurality of first interface units each accommodating an access line connected to at least one user terminal, a second interface unit accommodating a signal line connected to a management server for managing communication control information to be used in communication between the user terminals and a wide-area network, and a control unit for controlling forwarding of communication packets between each of the user terminals and the management server, wherein the control unit is provided with a management table comprised of a plurality of table entries each indicating, in association with a fixed address of one of the user terminals, a relationship between a connection port identifier for specifying the first interface unit to which the user terminal is connected and specific header information which is dynamically assigned to the user terminal by the management server and applied to each user packet by the user terminal, and the control unit determines based on the management table, while any of the user terminals is executing with the management server a predetermined communication protocol procedure prior to communication with the wide-area network, whether the specific header information can be assigned to the user terminal and discards, when it is determined that the specific header information should not be assigned to the user terminal, a packet received from the user terminal or a packet received from the management server and addressed to the user terminal.

More specifically, in the packet forwarding apparatus according to the present invention, when a first packet is received from any of the user terminals during the predetermined communication protocol procedure, the control unit determines whether the specific header information should be assigned to the user terminal by referring to the management table, adds a new table entry corresponding to the fixed address of the user terminal to the management table when it is determined that the specific header information can be assigned to the user terminal, and registers in the table entry the specific header information notified from the management server to the user terminal.

When the predetermined communication protocol procedure is, e.g., a PPPoE (Point-to-Point Protocol over Ethernet), the fixed address to be registered in the management table is a MAC address of the user terminal, and the specific header information is a PPPoE session identifier.

In this case, when the number of PPPoE session identifiers registered with a specific connection port identifier in the management table has reached a predetermined value, the control unit judges that a new PPPoE session connection request issued from the user terminal connected to the first interface unit having the specific connection port identifier cannot be accepted and discards packets received from the user terminal in a PPPoE discovery stage. On the other hand, when the number of PPPoE session identifiers registered with the specific connection port identifier in the management table is not more than the predetermined value, the control unit accepts a new PPPoE session connection request from the same user terminal and forwards PPPoE packets between the user terminal and the management server.

When the communication protocol procedure is, e.g., a DHCP (Dynamic Host Configuration Protocol), the fixed address to be registered in the management table is a MAC address of the user terminal, and the specific header information is an IP address of the user terminal. In this case, when the number of the table entries registered with a specific connection port identifier in the management table has reached a predetermined value, the control unit judges that an IP address assignment request issued from the user terminal connected to the first interface unit having the specific connection port identifier cannot be accepted and discards a DHCP packet for IP address assignment transmitted from the user terminal.

In accordance with the present invention, since the packet forwarding apparatus (L2SW) disposed between the management server of an ISP and a plurality of user terminals can alone limit the number of assigned IP addresses and the number of connected sessions for each access line, it becomes possible to reduce the concentration of a load on the management server of the ISP.

BRIEF DESCRIPTION OF THE DRAWINGS

FIG. 2 is a block structural view of a L2SW 10 applied to the first embodiment;

FIG. 3 shows a PPPoE session management table 40 provided in the L2SW 10 according to the first embodiment;

FIG. 11 is a block structural view of the L2SW 10 applied to the second embodiment;

FIG. 12 shows an IP address management table 70 provided in the L2SW 10 according to the second embodiment;

DESCRIPTION OF PREFERRED EMBODIMENTS

Figure 1:
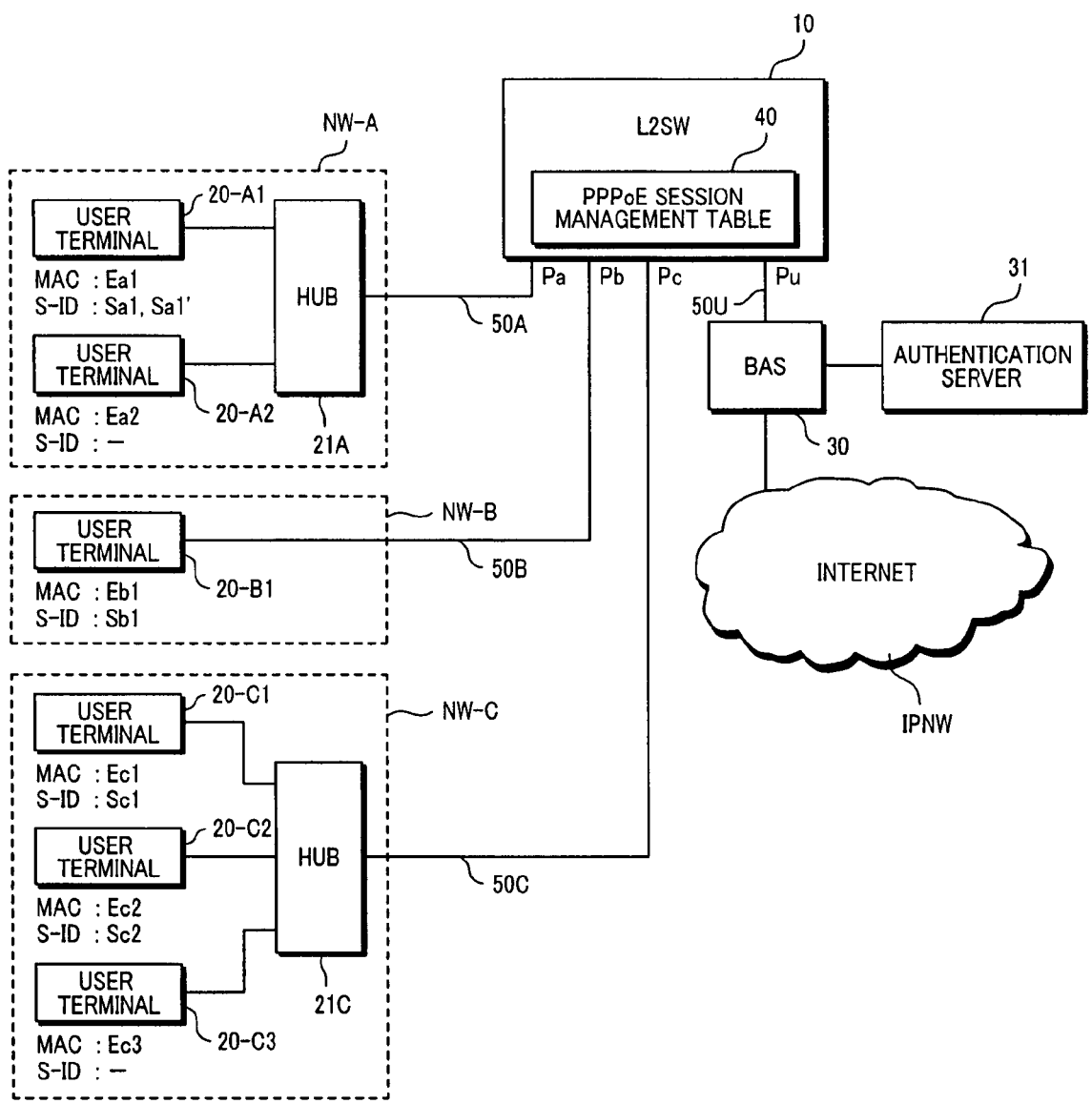
FIG. 1 shows a first embodiment of a network configuration including a packet forwarding apparatus (L2SW) according to the present invention.

Referring now to the drawings, the embodiments of the present invention will be described herein below.

Embodiment 1

FIG. 1 shows a first embodiment of a network configuration including a packet forwarding apparatus (Layer-2 switch: L2SW) 10 according to the present invention.

The network shown here is comprised of a plurality of user networks NW (NW-A, NW-B, NW-C, . . . ) connected to the L2SW 10 and the Internet IPNW. The L2SW 10 is connected to the Internet IPNW via a BAS (Broadband Access Server) 30 managed by an ISP. The BAS 30 is connected to an authentication server 31 for authenticating a user as an Internet connection requester. Alternatively, the function of the authentication server 31 may be installed in the BAS 30.

The user networks NW are subdivided into those in which a plurality of user terminals 20 (20-A1, 20-A2, and 20-C1 to 20-C3) are connected to the L2SW 10 via home hubs 21 (21A and 21C), such as NW-A and NW-C, and those in which a user terminal 20-B1 is connected directly to the L2SW 10 via an access line 50B, such as NW-B.

It is also possible, e.g., to place a home router at the position of the user terminal 20-B1 so as to connect a plurality of user terminals not shown to the access line 50B via the home router. Likewise, it is also possible to connect a plurality of user terminals to any branch line of the home hubs 21 via a home router. Accordingly, it will be assumed in the following description that the word "user terminal" 20 also includes such a home router.

The L2SW 10 has assigned different port IDs (Pa, Pb, Pc, . . . and Pu) to individual input/output ports (input/output line interfaces) accommodating access lines 50A, 50A, 50C, . . . connected to these user networks and a connection line 50U connected to the BAS 30.

Each of the user terminals 20 executes a PPPoE session connection procedure with the BAS 30 via the L2SW 10. When succeeded in PPPoE session connection, user authentication and IP address assignment by the authentication server 31, the user terminal 20 is allowed to transmit user packets to the Internet via the PPPoE session by using a session identifier (S-ID) and an assigned IP address. The BAS 30 decapsulates the user packet received through the PPPoE session and forwards the packet in the form of an IP packet to the Internet IPNW. On the other hand, an IP packet received from the Internet IPNW is encapsulated with a PPPoE header and forwarded to the PPPoE session corresponding to the destination address.

A feature if the present embodiment resides in that the L2SW 10 is provided with a PPPoE session management table 40 and controls the forwarding of communication packets between each of the user terminals and the BAS 30 by referring to the management table. In the PPPoE session management table 40, a connection port ID and the identifier (session ID) of a session already connected are stored in association with the fixed address (MAC address) of the user terminal that has requested a connection of a PPPoE session, as will be described in detail with reference to FIG. 3.

Upon receiving a PPPoE packet from any of the user terminals 20 or from the BAS 30, the L2SW 10 performs, after determining not only Layer-2 header (MAC) information attached to the received packet but also the type of a PPPoE message, the control of packet forwarding in accordance with the PPPoE session management table 40. For example, when a new PPPoE session connection request is received from any of the user terminals, the L2SW 10 checks whether the number of sessions already connected between the user terminal and the BAS 30 has reached a predetermined maximum value by referring to the PPPoE session management table 40.

If the number of already connected sessions has not reached the maximum value, the L2SW 10 registers a new table entry having the MAC address of the user terminal in the PPPoE session management table 40 and forwards the received packet to the BAS 30. If the number of already connected sessions has reached the maximum value, the L2SW 10 discards the received packet, thereby to inhibit the same user terminal from connecting multiple sessions in excess of the maximum value. In order to inhibit a new session connection, it is also possible for the L2SW 10 to forward a PPPoE session connection request packet to the BAS 30 without registering new table information in the PPPoE session management table 40 and discard a response packet received from the BAS 30 for the reason that table information corresponding to the response packet has not been registered in the PPPoE session management table 40.

FIG. 2 is a block structural view showing an embodiment of the L2SW 10 according to the present invention.

The L2SW 10 comprises a processor (control unit) 11, a memory 12 storing therein various programs to be executed by the processor 11, a data memory 13, plural pairs of input line interfaces 14-i (i=1 to n) and output line interfaces 15-I, and an internal bus 16 for connecting these components. In the memory 12, an upstream PPPoE packet processing routine 100, a downstream PPPoE packet processing routine 200, and a timer expiration monitor routine 300 are prepared as programs related to the present invention. In the data memory 13, the PPPoE session management table 40 and another table such as, e.g., a routing table defining routing information necessary for packet forwarding are prepared.

The input line interfaces 14-i and the output line interfaces 15-i are connected to any of the access lines or a connection line 50 (50A to 50U) shown in FIG. 1 and have the respective port IDs (Pa to Pu) assigned thereto. Received signals from the line 50-i are processed in the input line interfaces 14-i, converted into packets, and temporarily stored in an input buffer.

The processor 11 accesses these input line interfaces circularly and reads out the received packets from the input buffer one after another. The processor 11 processes the packets received from the input line interfaces for the access lines 50A to 50C connected to the user networks in accordance with the upstream PPPoE packet processing routine 100, while processing the packet received from the input line interface 14-*n* for the connection line connected to the BAS 30 in accordance with the downstream PPPoE packet processing routine 200. The detail of the upstream PPPoE packet processing routine 100 and the downstream PPPoE packet processing routine 200 will be described later with reference to FIGS. 8 and 9.

FIG. 3 shows an example of the PPPoE session management table 40.

The PPPoE session management table 40 is comprised of a plurality of table entries 400-1, 400-2, . . . each having a connection port ID column 42, a session ID column 43, and a timer expiration time column 44 in association with the MAC address 41 of one of the user terminals 20.

The connection port ID column 42 indicates the port ID of the input line interface 14 for the access line 50 to which a user terminal having the MAC address 41 is connected. The session ID column 43 indicates the identifiers of PPPoE sessions that have been already connected between the user terminal and the BAS 30. In the present embodiment, the number of PPPoE sessions simultaneously connectable by each of the user terminals is limited. Accordingly, a plurality of session IDs can be registered in each of the table entries 400 within the limit of a predetermined maximum value. In the timer expiration time column 44, timer expiration times for automatically disconnecting respective PPPoE sessions are registered in association with the session IDs.

A new table entry is added to the PPPoE session management table 40 when the L2SW 10 receives the first PPPoE session connection request packet PADI (PPPoE Active Discovery Initiation) from each of the user terminals. The new table entry includes the MAC address of the user terminal in the MAC address column 41 and the input port ID of a connection port from which the connection request packet was received in the connection port ID column 42. In the session ID column 43 of the new table entry, a reservation code indicating a state of awaiting a session ID assignment from the BAS 30 is set instead of the value of a session ID. In the timer expiration time column 44, a time value obtained by adding a predetermined time to the current time is set as a timer expiration time. The new table entry is added to the PPPoE session management table 40 by the upstream PPPoE packet processing routine 100 as will be described later.

Upon receiving a PADI packet, if a table entry having the source MAC address of the PADI packet already exists, there is no addition of a new table entry to the PPPoE session management table 40. In this case, the values of the reservation code and the timer expiration time are added to the existing table entry. Each time a PADI packet is received, the upstream PPPoE packet processing routine 100 checks the number of session IDs corresponding to the source MAC address of the received PADI packet by referring to the PPPoE session management table 40, thereby to reject a new PPPoE session connection request from the user terminal for which the number of registered session IDs has already reached the maximum value.

The value in the timer expiration time column 44 is updated by the upstream PPPoE packet processing routine 100 and the downstream PPPoE packet processing routine 200 each time a communication packet having the PPPoE session ID corresponding to the timer expiration time is received. The timer expiration monitor routine 300 periodically checks the timer expiration time column 44 and automatically deletes the session ID that has reached the timer expiration time from the PPPoE session management table 40. When the session ID column 43 has become empty as a result of deleting one session ID, the table entry itself is deleted from the PPPoE session management table 40.

Although individual time values for each session ID are set as the timer expiration time 44 in FIG. 3, the same timer expiration time may also be used commonly by a plurality of session IDs in the same table entry. In this case, when packet communication has ceased in all the PPPoE sessions for the same user terminal, timer expiration occurs and the table entry is deleted from the PPPoE session management table 40.

In FIG. 1, the values of the MAC and S-ID shown in association with each of the user terminals 20 indicate the MAC address of the user terminal and the session ID of the PPPoE session that the user terminal is currently connecting. The table entries 400-1 to 400-4 in FIG. 3 show the connection states of the PPPoE sessions from the individual user terminals 20-A1, 20-B1, 20-C1, and 20-C2, respectively.

Figure 4:
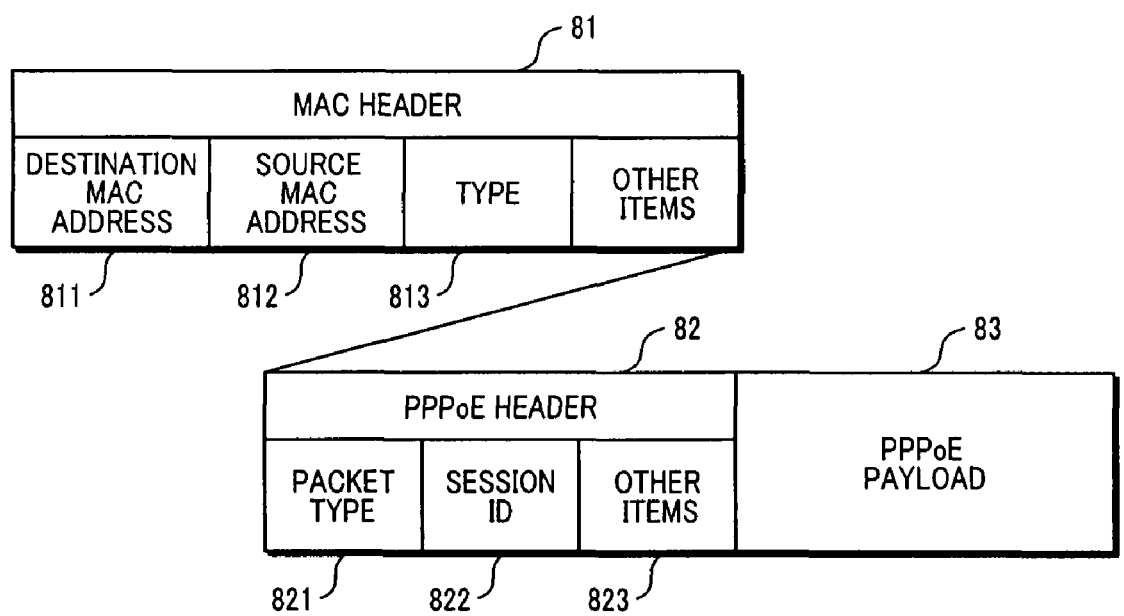
FIG. 4 shows a format of a PPPoE packet.

FIG. 4 shows a packet format to a PPPoE packet.

The PPPoE packet comprises a MAC header 81, a PPPoE header 82, and a PPPoE payload 83. The MAC header 81 includes a destination MAC address 811 and a source MAC address 812 indicating the addresses of the destination and source of a packet in a sub-net segment, a type 813 indicating the format of a packet following the MAC header, and other information items. In the case of the PPPoE packet, it will be understood from the value of the type 813 that the PPPoE header 82 is located next to the MAC header 81.

The PPPoE header 82 includes a packet type code 821, a session identifier (S-ID) 822, and other information items. Based on the value of the packet type code 821, the type of a packet (message) included in the PPPoE payload 83 is specified. In the case of a PPPoE packet transmitted at a stage where the session ID value is not defined yet such as, e.g., a PADI, a PADO (PPPoE Active Discovery Offer), or a PADR, a value indicating undefined session ID is set as the S-ID 822. In the case of a PPPoE packet transmitted at a stage where the session ID has been defined such as, e.g., a PADS (PPPoE Active Discovery Session-confirmation), a PADT (PPPoE Active Discovery Terminate), or communication packets transmitted in a session stage, the PPPoE session can be identified based on the value of the S-ID 822.

Each communication packet transmitted in the PPPoE discovery stage includes various parameter values related to a new session in the PPPoE payload 83. Communication packets transmitted in the PPPoE session stage and stages subsequent thereto include various PPP packets in the PPPoE payloads 83.

Figure 5:
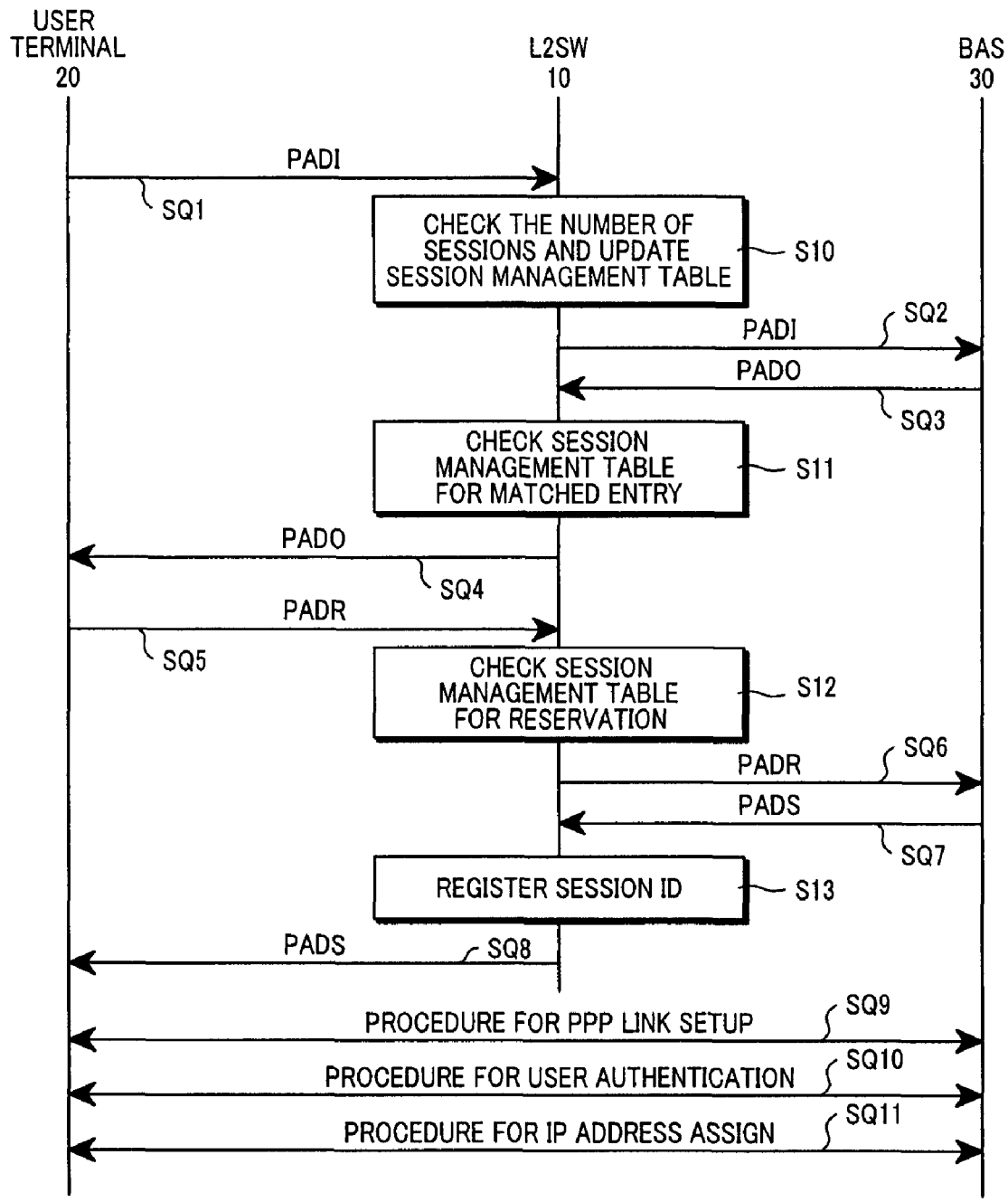
FIG. 5 shows a communication sequence to connect a PPPoE session and the operation of the L2SW in the first embodiment.

FIG. 5 shows a communication sequence and the operation of the L2SW 10 performed when any of the user terminals 20 connects a new PPPoE session with the BAS 30.

In FIG. 5, Steps SQ1 to SQ8 belong to a communication sequence in the PPPoE discovery stage to which the present invention relates. Steps SQ9, SQ10, and SQ11 indicate a communication sequence in the PPPoE session stage performed through the PPPoE session connected in the PPPoE discovery stage.

To connect a new PPPoE session, the user terminal 20 transmits a PADI (PPPoE Active Discovery Initiation) packet addressed to the BAS 30 (SQ1). Upon receiving the PADI packet, the L2SW 10 checks the number of already connected sessions by user, which is specified by the source MAC address and connection port ID of the received packet, by referring to the PPPoE session management table 40 (S10). When there is no table entry having the MAC address 41 matched with the source MAC address in the PPPoE session management table 40, the L2SW 10 adds a new table entry having the source MAC address as the MAC address 41 and forwards the received PADI packet to the BAS 30 (SQ2).

When a table entry having the MAC address 41 matched with the source MAC address already exists in the PPPoE session management table 40, the L2SW 10 reserves a session ID field in the session ID column provided that the number of already connected sessions has not reached the maximum value and forwards the received PADI packet to the BAS 30. If the number of already connected sessions has reached the maximum value, the L2SW 10 discards the received PADI packet. Alternatively, it is also possible for the L2SW 10 to forward the received PADI packet to the BAS 30 and discard a response packet received thereafter from the BAS 30, for the reason that the session ID field has not been reserved or the number of already connected sessions has reached the maximum value.

Upon receiving the PADI packet, the BAS 30 returns a PPPoE PADO (PPPoE Active Discovery Offer) packet as a response packet (SQ3). Upon receiving the PADO packet from the BAS 30, the L2SW 10 checks whether a table entry corresponding to the destination MAC address of the received PADO packet has been registered in the PPPoE session management table 40 (S11). If the table entry having the destination MAC address has been already registered and the session ID column has been already reserved, the L2SW 10 outputs the received packet to an output line interface having the port ID corresponding to the destination MAC address, whereby the PADO packet is forwarded to the requester user terminal 20 (SQ4). In the case where the session ID column has not been reserved or the table entry corresponding to the destination MAC address has not been registered in the PPPoE session management table 40, the L2SW 10 discards the received PADO packet.

The user terminal 20 having received the PADO packet transmits a PADR (PPPoE Active Discovery request) packet addressed to the BAS 30 (SQ5). Upon receiving the PADR packet, the L2SW 10 checks the PPPoE session management table 40 (S12) and forwards the received PADR packet to the BAS 30 if the table entry having the MAC address 41 matched with the source MAC address of the received packet has been already registered and the session ID column has been already reserved (SQ6). In the case where the table entry corresponding to the source MAC address has not been registered or the session ID column has not been reserved, the L2SW 10 discards the received PADR packet.

Upon receiving the PADR packet, the BAS 30 returns a PADS (PPPoE Active Discovery Session-configuration) packet as a response packet (SQ7). Upon receiving the PADS packet from the BAS 30, the L2SW 10 searches the PPPoE session management table 40 for a table entry corresponding to the destination MAC address of the received packet, registers the session ID indicated in the received PADS packet in the table entry (S13), and forwards the PADS packet to the user terminal 20 (SQ8). The L2SW 10 also discards the received packet in the cases of the PADS packet, if the table entry corresponding to the destination MAC address has not been registered or if the session ID field has not been reserved.

The user terminal 20 having received the PADS packet executes thereafter with the BAS 30 a procedure for PPP link set up in the PPPoE session stage (SQ9), a procedure for user authentication (SQ10), and a procedure for IP address assignment (SQ11). Thus, the user terminal 20 transits in an Internet communication state.

Figure 6:
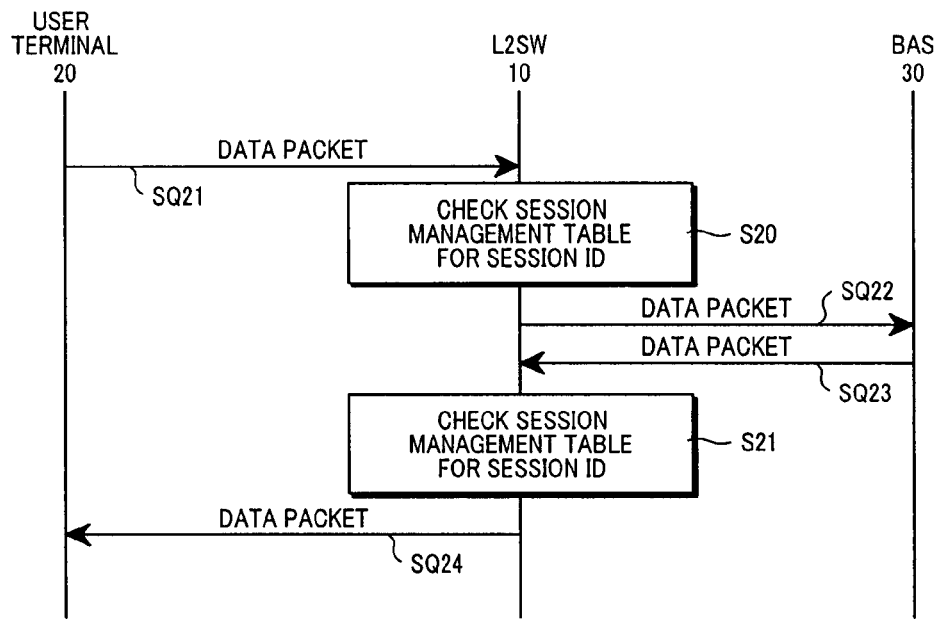
FIG. 6 shows a communication sequence of a data packet in the PPPoE session stage in the first embodiment.

FIG. 6 shows a communication sequence of a data packet in the PPPoE session stage. The data packet (PPP packet) communicated by the user terminal 20 was encapsulated with the PPPoE header including the session ID 822.

When the user terminal 20 transmits a data packet (SQ21), the L2SW 10 having received the data packet checks the PPPoE session management table 40 (S20), and forwards the received packet to the BAS 30 (SQ22) after confirming that the session ID of the received packet has been already registered in the table entry corresponding to the source MAC address of the received packet. In the case where the table entry corresponding to the source MAC address has not been registered in the PPPoE session management table 40 or the session ID indicated in the received packet has not been registered in the table entry corresponding to the source MAC address, the L2SW 10 discards the received packet. Upon receiving the data packet from the L2SW 10, the BAS 30 decapsulates the received data packet and forwards the resultant packet to the Internet.

On the other hand, a data packet transmitted from the Internet (e.g., a Web server), which is addressed to the user terminal 20, is encapsulated with the PPPoE header including the session ID 822 by the BAS 30 and transmitted to the L2SW 10 (SQ23) Upon receiving the data packet from the BAS 30, the L2SW 10 checks the PPPoE session management table 40 (S21), and forwards the received packet to the user terminal 20 (SQ24) after confirming that the session ID of the received packet has been already registered in the table entry corresponding to the destination MAC address of the received packet. In the case where the table entry corresponding to the destination MAC address has not been registered in the PPPoE session management table 40 or the session ID indicated in the received packet has not been registered in the table entry corresponding to the destination MAC address, the L2SW 10 discards the received packet.

Figure 7:
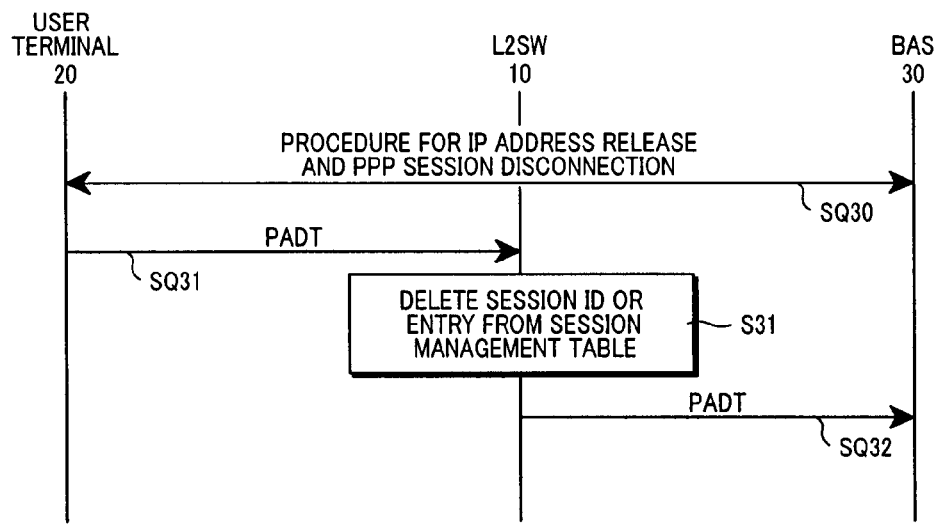
FIG. 7 shows a communication sequence to disconnect a PPPoE session in the first embodiment.

FIG. 7 shows a communication sequence to disconnect a PPPoE session. The PPPoE session disconnection sequence is divided into a PPPoE session stage SQ30 and a PPPoE discovery stage succeeding the PPPoE session stage SQ30.

In the case of disconnecting the PPPoE session by the user terminal 20, the user terminal executes the PPPoE session stage (procedure for IP address release and PPP link disconnection) SQ30 first with the BAS 30. After that, the user terminal transmits a PADT (PPPoE Active Discovery Terminate) packet addressed to the BAS 30 (SQ31). Upon receiving the PADT packet, the L2SW 10 searches the PPPoE session management table 40 for a table entry corresponding to the source MAC address of the received packet, deletes the session ID indicated in the received packet from the table entry (S31), and forwards the received packet to the BAS 30 (SQ32). If the session ID column 43 of the table entry becomes empty as a result of deleting the session ID, the L2SW 10 deletes the table entry itself from the PPPoE session management table 40.

In the case of disconnecting the PPPoE session by the BAS 30, the deletion of the data from the PPPoE session management table 40 and the forwarding of the PADT packet are performed in accordance with the same procedure as shown in FIG. 7.

Figure 8:
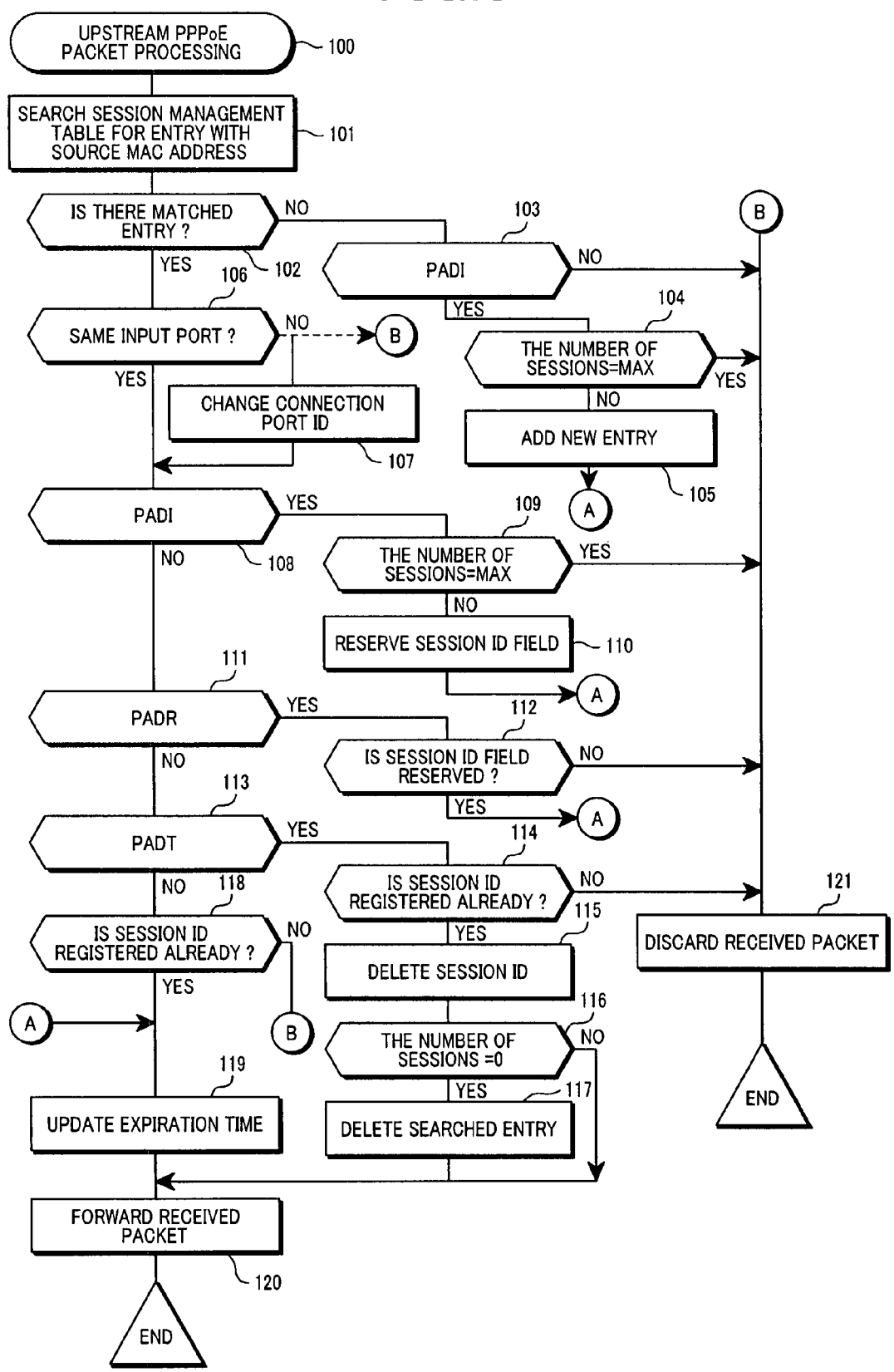
FIG. 8 shows a flow chart of an upstream PPPoE packet processing routine 100 to be executed in the L2SW 10.

FIG. 8 shows a flow chart of the upstream PPPoE packet processing routine 100.

The processor 11 of the L2SW 10 reads out a received packet from one of the input line interfaces 14 connected to the user networks NW and searches the PPPoE session management table 40 for a table entry having the MAC address 41 matched with the source MAC address of the received packet (Step 101). When no table entry having the matched MAC address was found as a result of table search (102), the processor 11 determines the type of the received packet (103), discards the received packet if the received packet is not a PADI packet (121), and terminates the routine.

When the received packet is a PADI packet, the processor 11 counts the number of sessions, already registered in the PPPoE session management table 40, with the same connection port ID 42 as the input port ID of the received packet and determines whether the number of sessions has reached a predetermined maximum value MAX (104). If the number of sessions has reached the maximum value, the processor 11 discards the received packet (121) and terminates the routine.

When the number of sessions is less than the maximum value, the processor 11 generates a new table entry, which includes the source MAC address and input port ID of the received packet as the MAC address 41 and the connection port ID 42, respectively, and reserves a vacant field in the session ID column 43, and adds the new table entry to the PPPoE session management table 40 (105). Thereafter, the processor 11 updates the timer expiration time 44 corresponding to the reserved session ID field (119), forwards the received packet to the output line interface 15-$n$ accommodating the connection line 50U connected to the BAS 30 (120), and terminates the routine.

When a table entry having the MAC address 41 matched with the source MAC address of the received packet was searched in Step 102, the processor 11 compares the connection port ID 42 indicated in the searched table entry with the input port ID of the received packet (106). When the two port IDs are matched, the processor 11 determines the type of the received packet (108). If the two ports are unmatched, the processor 11 judges that the user terminal is of a mobile type having moved to another user network and transmitted the packet. In this case, after changing the value of the connection port ID 42 of the table entry to the input port ID of the received packet (107), the processor 11 determines the type of the received packet (108). Alternatively, the processor 11 may discard the received packet (121) when the two port IDs are unmatched and terminate the routine, as shown by the broken arrow.

When the received packet is a PADI packet in Step 108, the processor 11 counts the number of sessions (the number of session IDs), already registered in the PPPoE session management table 40, with the same connection port ID 42 as the input port ID of the received packet and determines whether the number of sessions has reached a predetermined maximum value (109). If the number of sessions has reached the maximum value, the processor 11 discards the received packet (121) and terminates the routine. When the number of sessions is less than the maximum value, the processor 11 reserves an vacant field in the session ID column 43 (110), updates the timer expiration time corresponding to the reserved field (119), forwards the received packet to the BAS 30 (120), and terminates the routine.

When the received packet is not a PADI packet, the processor 11 determines whether the received packet is a PADR packet (111). If the received packet is a PADR packet, the processor 11 checks the session ID column of the searched table entry (112). When the session ID column has not been reserved, the processor discards the received packet (121) and terminates the routine. When the session ID column has been reserved, the processor 11 updates the timer expiration time (119), forwards the received packet to the BAS 30 (120), and terminates the routine.

When the received packet is not a PADR packet in Step 111, the processor 11 determines whether the received packet is a PADT packet (113). When the received packet is a PADT packet, the processor 11 determines whether the session ID indicated as the target of disconnection by the received PADT packet has been registered in the session ID column 43 of the table entry (114). If the target session ID has not been registered in the table entry, the processor 11 discards the received packet (121) and terminates the routine.

When the target session ID has been registered in the table entry, the processor 11 deletes the target session ID from the table entry (115) and determines the number of remaining sessions (the number of IDs) in the table entry (116). When the number of remaining sessions is not zero, the processor 11 forwards the received packet to the BAS 30 (120) and terminates the routine. When the number of remaining sessions in the table entry becomes zero as a result of deleting the session ID, the processor 11 deletes the table entry itself from the PPPoE session management table 40 (117), forwards the received packet to the BAS 30 (120), and terminates the routine.

When the received packet is not a PADT packet in Step S113, the processor 11 determines whether the session ID indicated in the received packet has been registered in the session ID column 43 of the table entry (118). If the session ID has not been registered in the table entry, the processor 11 discards the received packet (121) and terminates the routine. When the session ID has been registered in the table entry, the processor 11 updates the timer expiration time corresponding to the session ID indicated in the receive packet (119), forwards the received packet to the BAS 30 (120), and terminates the routine.

Figure 9:
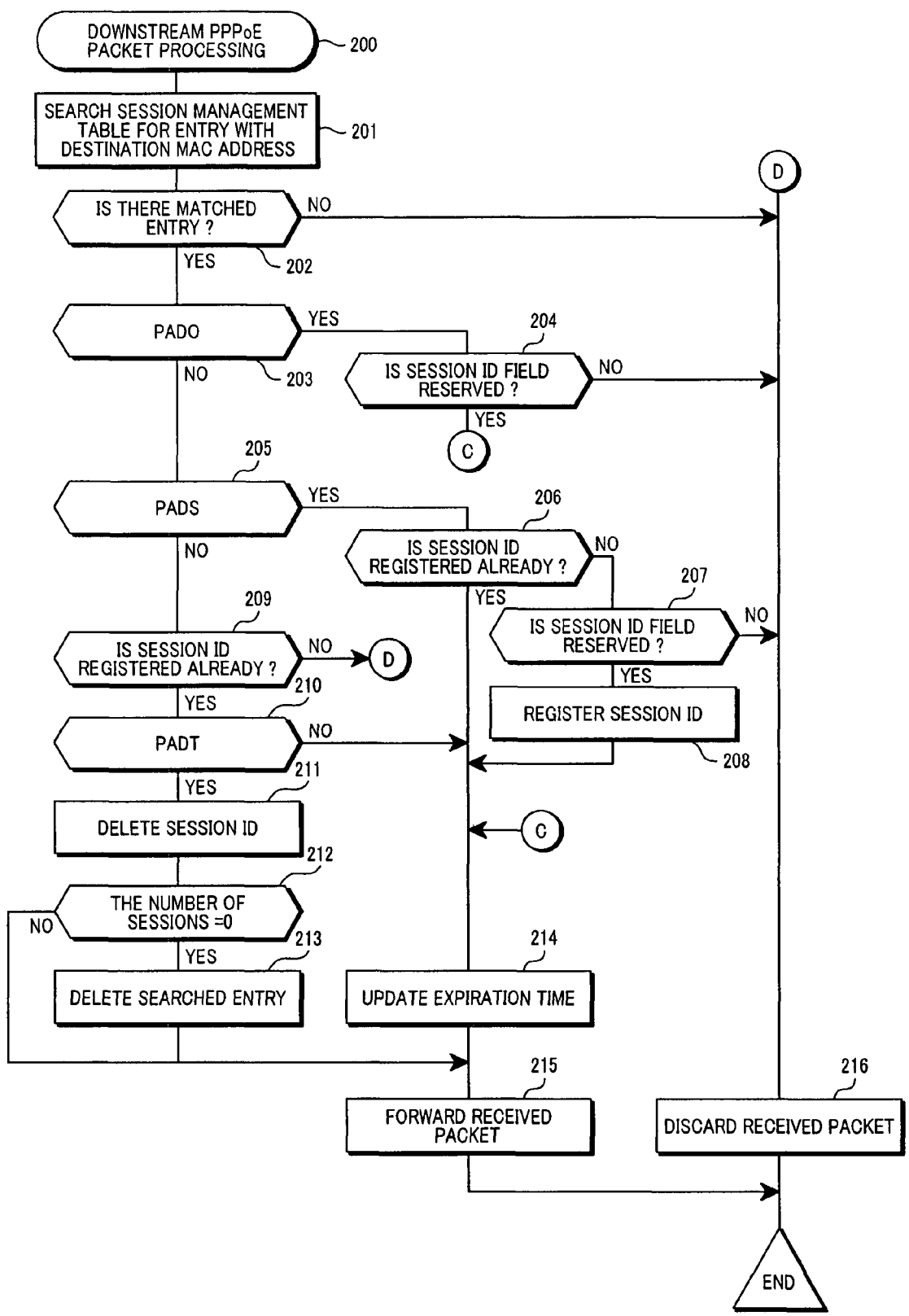
FIG. 9 shows a flow chart of a downstream PPPoE packet processing routine 200 to be executed in the L2SW 10.

FIG. 9 shows a flow chart of the downstream PPPoE packet processing routine 200.

The processor 11 of the L2SW 10 reads out a received packet from the input line interface 14-$n$ connected to the BAS 30 and searches the PPPoE session management table 40 for a table entry having the MAC address 41 matched with the destination MAC address of the received packet (Step 201). When no table entry corresponding to the destination MAC address was found as a result of table search (202), the processor 11 discards the received packet (216) and terminates the routine.

When a table entry corresponding to the destination MAC address was searched in Step 202, the processor 11 determines the type of the received packet. When the received packet is a PADO packet (203), the processor 11 checks the session ID column 43 of the table entry (204). If the session ID column 43 has not been reserved (204), the processor 11 discards the received packet and terminates the routine. If the session ID column 43 has been reserved, the processor 11 updates the timer expiration time corresponding to the reserved field (214), forwards the received packet to one of the output line interfaces 15 for accommodating the user network corresponding to the destination MAC address (215), and terminates the routine.

When the received packet is a PADS packet (205), the processor 11 determines whether an assigned session ID indicated in the PADS packet has been already registered in the table entry (206). If the assigned session ID has been already registered, the processor 11 updates the value of the timer expiration time corresponding to the session ID in the timer expiration time column 44 of the table entry (214), forwards the received packet to one of the output line interfaces 15 connected to the user network corresponding to the destination MAC address (215), and terminates the routine.

When the assigned session ID has not been registered in the table entry in Step 206, the processor 11 checks the session ID column 43 of the table entry (207). If a vacant field in the session ID column 43 has not been reserved, the processor 11 discards the received packet (216) and terminates the routine. When a vacant field in the session ID column 43 has been reserved, the processor 11 registers the session ID indicated in the PADS packet in the session ID column 43 (208), updates the timer expiration time corresponding to the session ID (214), forwards the received packet to one of the output line interfaces 15 connected to the user network corresponding to the destination MAC address (215), and terminates the routine.

When the received packet is not a PADS packet in Step 206, the processor 11 determines whether the session ID of the received packet has been already registered in the session ID column 43 of the table entry (209). If the session ID of the received packet has not been registered, the processor 11 discards the received packet (216) and terminates the routine. If the session ID of the received packet has been already registered, the processor 11 determines whether the received packet is a PADT packet (210).

When the received packet is a PADT packet, the processor 11 deletes the session ID indicated in the PADS packet from the table entry (211) and checks the number of remaining sessions (the number of session IDs) in the table entry (212). If the number of remaining sessions is not zero, the processor 11 forwards the received packet to one of the output line interfaces 15 connected to the user network corresponding to the destination MAC address (215) and terminates the routine. When the number of remaining sessions becomes zero, the processor 11 deletes the table entry itself from the PPPoE session management table 40 (213) and executes Step 215.

When the received packet is a packet (e.g., a data packet) other than a PADT packet in Step 210, the processor 11 updates the timer expiration time corresponding to the session ID indicated in the received packet (214), forwards the received packet to one of the output line interfaces 15 connected to the user network corresponding to the destination MAC address (215), and terminates the routine.

Embodiment 2

Figure 10:
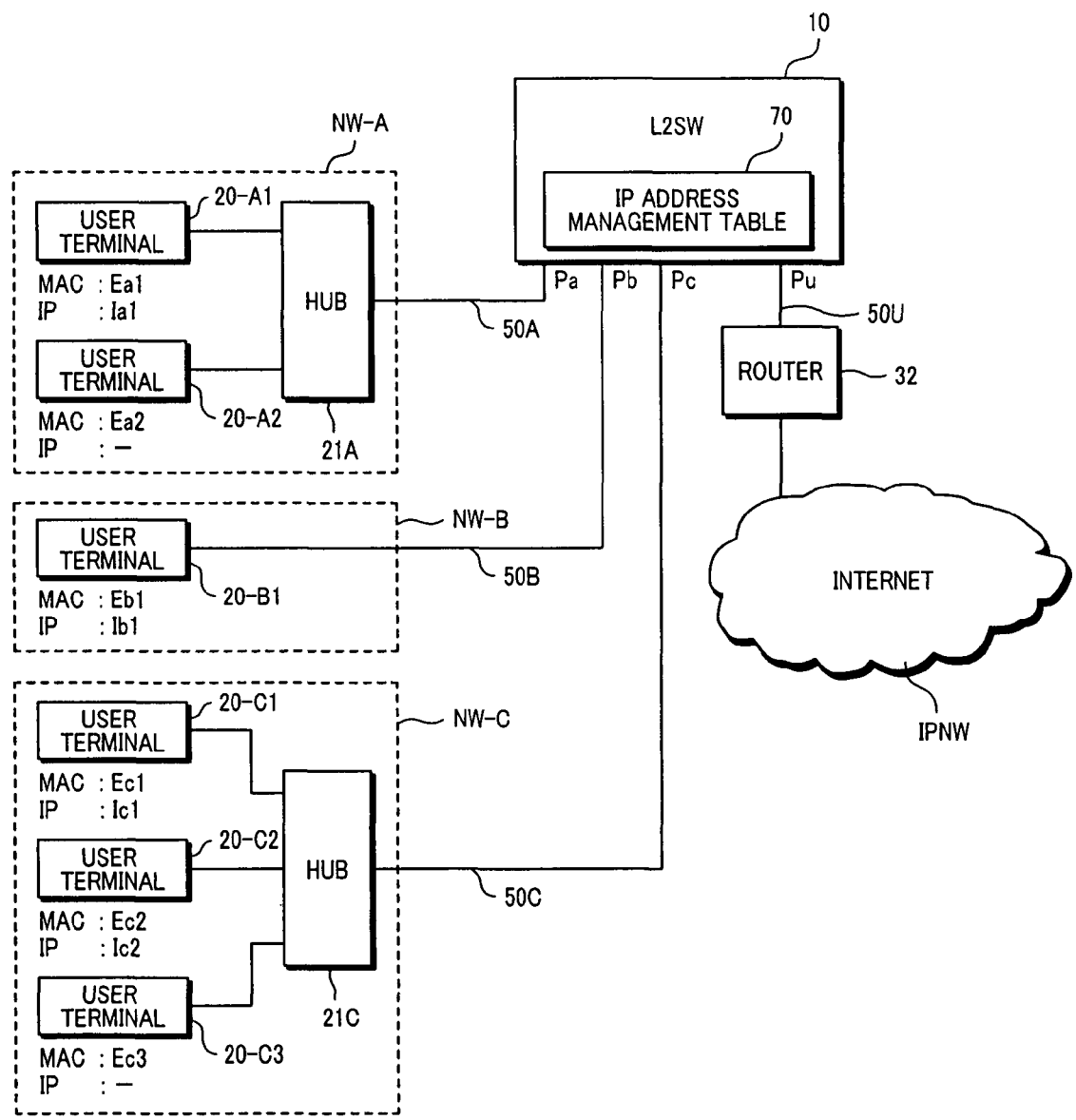
FIG. 10 shows a second embodiment of the network configuration including a packet forwarding apparatus (L2SW) according to the present invention.

FIG. 10 shows a second embodiment of the network configuration including the packet forwarding apparatus (Layer-2 switch: L2SW) 10 according to the present invention. As contrast with FIG. 1, a feature of the network according to the present embodiment resides in that L2SW 10 is provided with an IP address management table 70 and connected to the Internet IPNW via a router 32.

The router 32 has the function of a DHCP server for performing the assignment/release of an IP address with an expiration time with respect to the user terminal 20 in accordance with the DHCP (Dynamic Host Configuration Protocol). Alternatively, it is also possible to place a DHCP relay agent at the position of the router 32. In this case, a DHCP server is prepared in addition to the router 32 (DHCP relay agent) so that any of the user terminals 20 and the DHCP server communicate DHCP packets via the router 32.

In the present embodiment, the L2SW 10 limits the number of IP addresses to be assigned to user terminals on a per access-line basis by using the IP address management table 70 and controls packet communication between the user terminal 20 and the router 32.

FIG. 11 shows a block structural view of the L2SW 10 applied to the second embodiment.

The L2SW 10 according to the present embodiment comprises the same components as the L2SW shown in FIG. 2. An upstream packet processing routine 400, a downstream packet processing routine 500, and a lease duration monitoring routine 600 are prepared in the memory 12 as programs related to the present invention to be executed by the processor 11. The IP address management table 70 is formed in the memory 13.

The upstream packet processing routine 400 is a program for controlling the forwarding of IP packets (including DHCP packets) or ARP (Address Resolution Protocol) packets received from the user terminals 20. The upstream packet processing routine 400 updates the IP address management table 70 if necessary and determines whether the received packets should be forwarded to the router 32 or not in accordance with the IP address management table 70.

The downstream packet processing routine 500 is a program for controlling the forwarding of IP packets (including DHCP packets) or ARP packets received from the router 32. The downstream packet processing routine 500 updates the IP address management table 70 if necessary and determines whether the received packets should be forwarded to the user terminals 20 or not in accordance with the IP address management table 70.

FIG. 12 shows an example of the IP address management table 70.

The IP address management table 70 is comprised of a plurality of table entries 700-1, 700-2, . . . each indicating a connection port ID 72, an assigned IP address 73, and a lease expiration time 74 in association with the MAC address 71 of one of the user terminals 20.

The connection port ID 72 indicates the port identifier of one of the input line interfaces accommodating an access line connected to the user terminal having the MAC address 71 in the same manner as in the first embodiment. The assigned IP address 73 indicates the value of the IP address with an expiration time assigned to the user terminal by the router 32. The lease expiration time 74 indicates the expiration time of the assigned IP address.

To the IP address management table 70, a new table entry is added by the upstream packet processing routine 400 when the L2SW 10 receives a connection request (DHCP DISCOVER) packet from a user terminal. In each of the table entries, the assigned IP address 73 and the lease expiration time 74 are registered by the downstream packet processing routine 500 when the L2SW 10 receives an IP address acknowledgement (DHCP ACK) packet returned by the router 32 in response to an IP address assignment request (DHCP REQUEST) packet from the user terminal.

The lease expiration time 74 is extendable according to a request from the user terminal and periodically checked by the lease duration monitoring routine 600. A table entry that has reached the lease expiration time is automatically deleted from the IP address management table 70 by the lease duration monitoring routine 600.

In contrast to the first embodiment in which a plurality of session IDs can be assigned to one MAC address (user terminal), only one IP address is assigned to each of the MAC addresses (user terminals) in the second embodiment.

Figure 13:
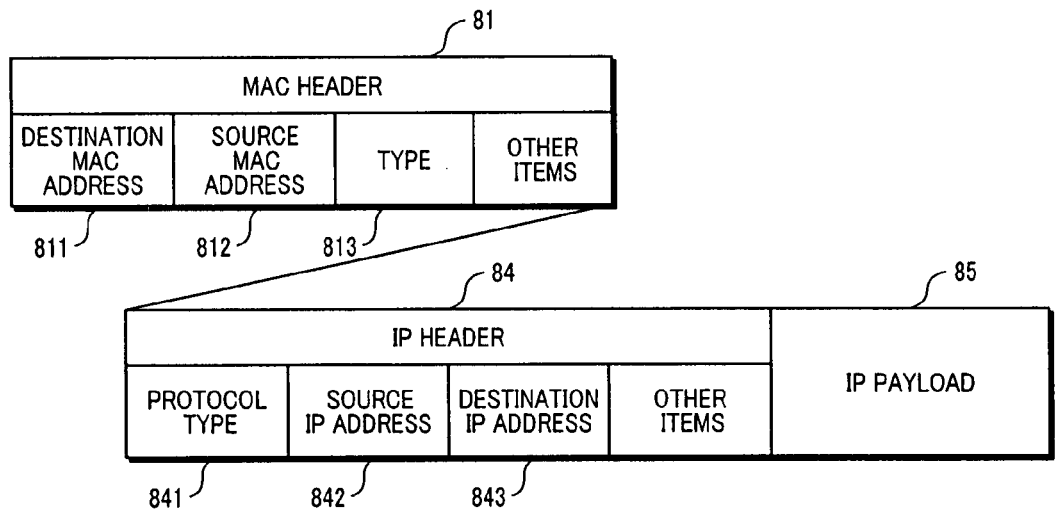
FIG. 13 shows a format of a packet communicated by the L2SW in the second embodiment.

FIG. 13 shows a format of a data packet and a DHCP packet communicated by the L2SW 10 in the present embodiment.

Each of the data packets and the DHCP packets received by the L2SW 10 from the user terminal 20 or the router 32 comprises a MAC header 81, an IP header 84, and an IP payload 85. The IP header includes a protocol type 841, a source IP address 842, a destination IP address 843, and other information items. The protocol type 841 indicates a protocol applied to the IP payload 85. For example, when the IP payload includes a UDP packet, a specified value indicating the UDP packet is set to the protocol type 841.

Figure 14:
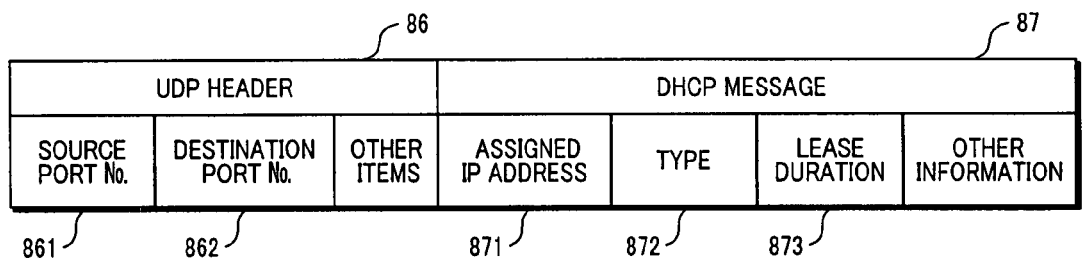
FIG. 14 shows a format of a DHCP packet included in an IP payload 87 of FIG. 13.

The DHCP packet is a kind of UDP (User Datagram Protocol) packet. The IP payload 85 includes, as shown in FIG. 14, a UDP header 86 and a DHCP message 87. The UDP header 86 includes a source port number 861, a destination port number 862, and other information items. In the case of the DHCP packet, specific values indicating the DHCP protocol are set as the source port number and the destination port number. When a packet of another protocol other than the DHCP follows the UDP header 86, values corresponding to the protocol are set as these port numbers.

The DHCP message 87 includes an assigned IP address 871, a message type 872, a lease duration 873, and other information items. The assigned IP address 871 indicates an IP address assigned to the user terminal by the router 32 or a candidate IP address to be assigned. When the IP address to be assigned is not defined yet, a specific value indicating undefined IP address is set to a field of the IP address 871.

To the message type 872, a code indicating the type of the DHCP message such as, e.g., "DISCOVER", "OFFER", "REQUEST", "ACK", "NAK", "DECLINE", or "RELEASE" is set. To the lease duration 873, a value or wished value indicating the expiration time of the IP address assigned to the user terminal by the router 32 is set. However, the lease duration 873 becomes unnecessary depending on the type of the DHCP message.

Figure 15:
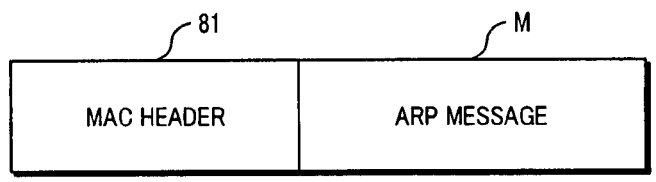
FIG. 15 shows a format of an ARP packet.

FIG. 15 shows a format of an ARP packet to be transmitted from the user terminal to know the MAC address corresponding to the IP address. The ARP packet includes an ARP message M subsequent to the MAC header 81.

Figure 16:
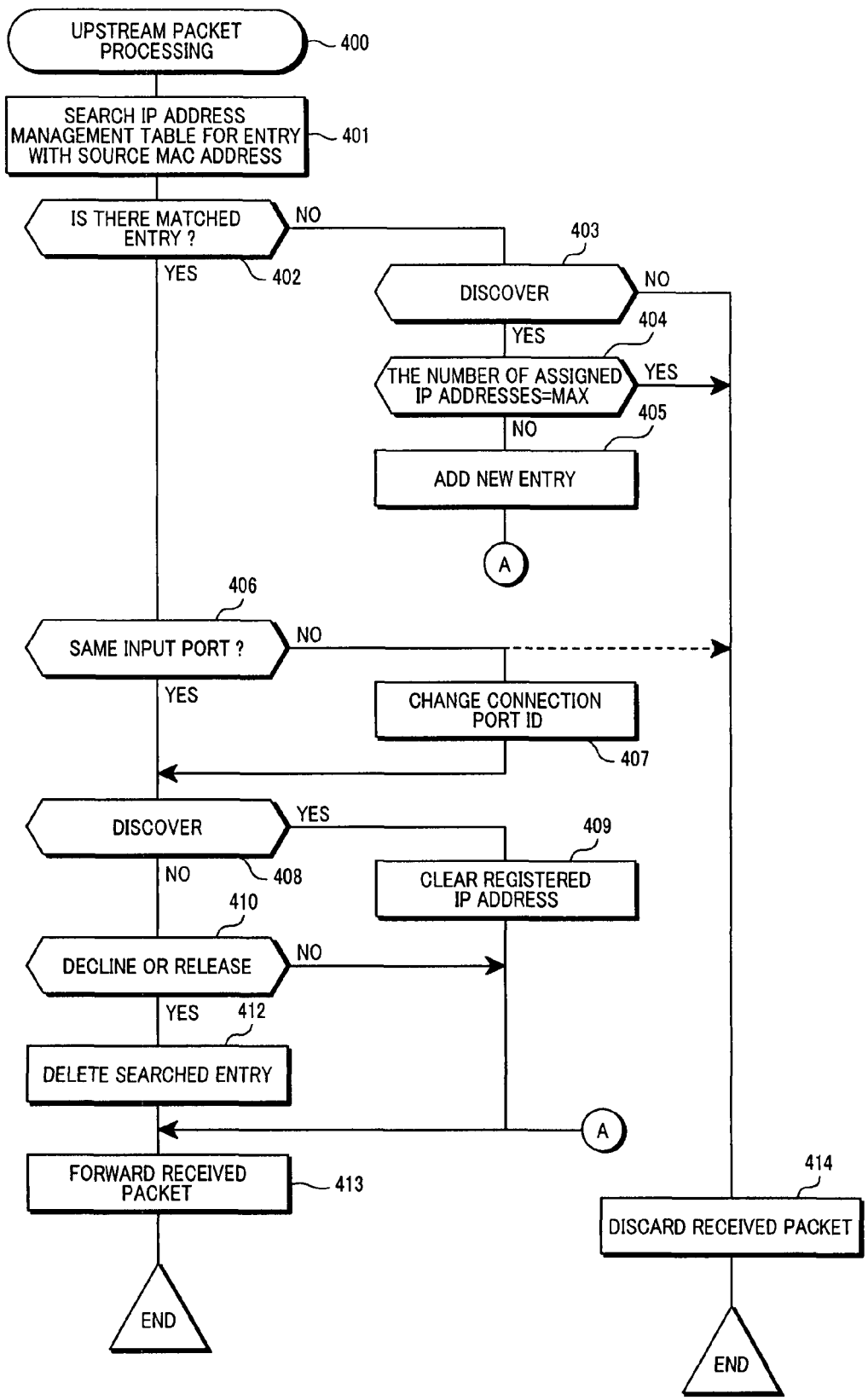
FIG. 16 is a flow chart of an upstream packet processing routine 400 to be executed in the L2SW 10 according to the second embodiment.

FIG. 16 shows a flow chart of the upstream packet processing routine 400.

The processor 11 of the L2SW 10 reads out a received packet from one of the input line interfaces 14 connected to the user networks NW and searches the IP address management table 70 for a table entry having the MAC address 71 matched with the source address of the received packet (Step 401). When no table entry corresponding to the source MAC address was found as a result of the table search (402), the processor 11 determines the type of the received packet (403). If the received packet is not a DHCP DISCOVER packet, the processor 11 discards the received packet (414) and terminates the routine.

When the received packet is a DHCP DISCOVER packet, the processor 11 counts the number of assigned IP addresses (the number of table entries), already registered in the IP address management table 70, with the same connection port ID 72 as the input port ID of the received packet and determines whether the number of assigned IP addresses has reached a predetermined maximum value MAX (404). If the number of assigned IP addresses with the same connection port ID has reached the maximum value, the processor 11 discards the received packet (414) and terminates the routine.

When the number of assigned IP addresses has not reached the maximum value yet, the processor 11 creates a new table entry which includes the source MAC address and input port ID of the received packet as the MAC address 71 and the connection port ID 72, respectively. The assigned IP address column 73 and the lease expiration time column 74 are vacant. After adding the new table entry to the IP address management table 70 (405), the processor 11 forwards the received packet to the output line interface 15-n accommodating the connection line connected to the router 32 (413) and terminates the routine.

When a table entry corresponding to the source MAC address of the received packet was found in Step 402, the processor 11 compares the connection port ID 72 indicated in the searched table entry with the input port ID of the received packet (40). When the two port IDs are matched, the processor 11 determines the type of the received packet (408). If the two port IDs are unmatched, the processor 11 judges that the user terminal is of a mobile type having moved to another user network and transmitted the packet. In this case, after changing the value of the connection port ID 72 of the table entry to the input port ID of the received packet (407), the processor 11 determines the type of the received packet (408). Alternatively, the processor 11 may discard the received packet (414) when the two port IDs are unmatched and terminates the routine, as shown by the broken arrow.

When the received packet is a DHCP DISCOVER packet, the processor 11 judges that the DHCP DISCOVER packet has been transmitted again from the same user terminal. In this case, after clearing the assigned IP address 73 in the table entry (409), the processor 11 forwards the received packet to the output line interface 15-n accommodating the connection line connected to the router 32 (413), and terminates the routine.

When the received packet is a DHCP DECLINE packet or a DHCP RELEASE packet for releasing an IP address (410), the processor 11 deletes the searched table entry from the IP address management table 70 (412), forwards the received packet to the output line interface 15-n accommodating the connection line connected to the router 32 (413), and terminates the routine.

When the received packet does not correspond to any of a DHCP DISCOVER packet, a DHCP DECLINE packet, and a DHCP RELEASE packet, i.e., when the result of determination in Step 410 is "No", the processor 11 forwards the received packet to the output line interface 15-n accommodating the connection line connected to the router 32 (413) and terminates the routine.

Figure 17:
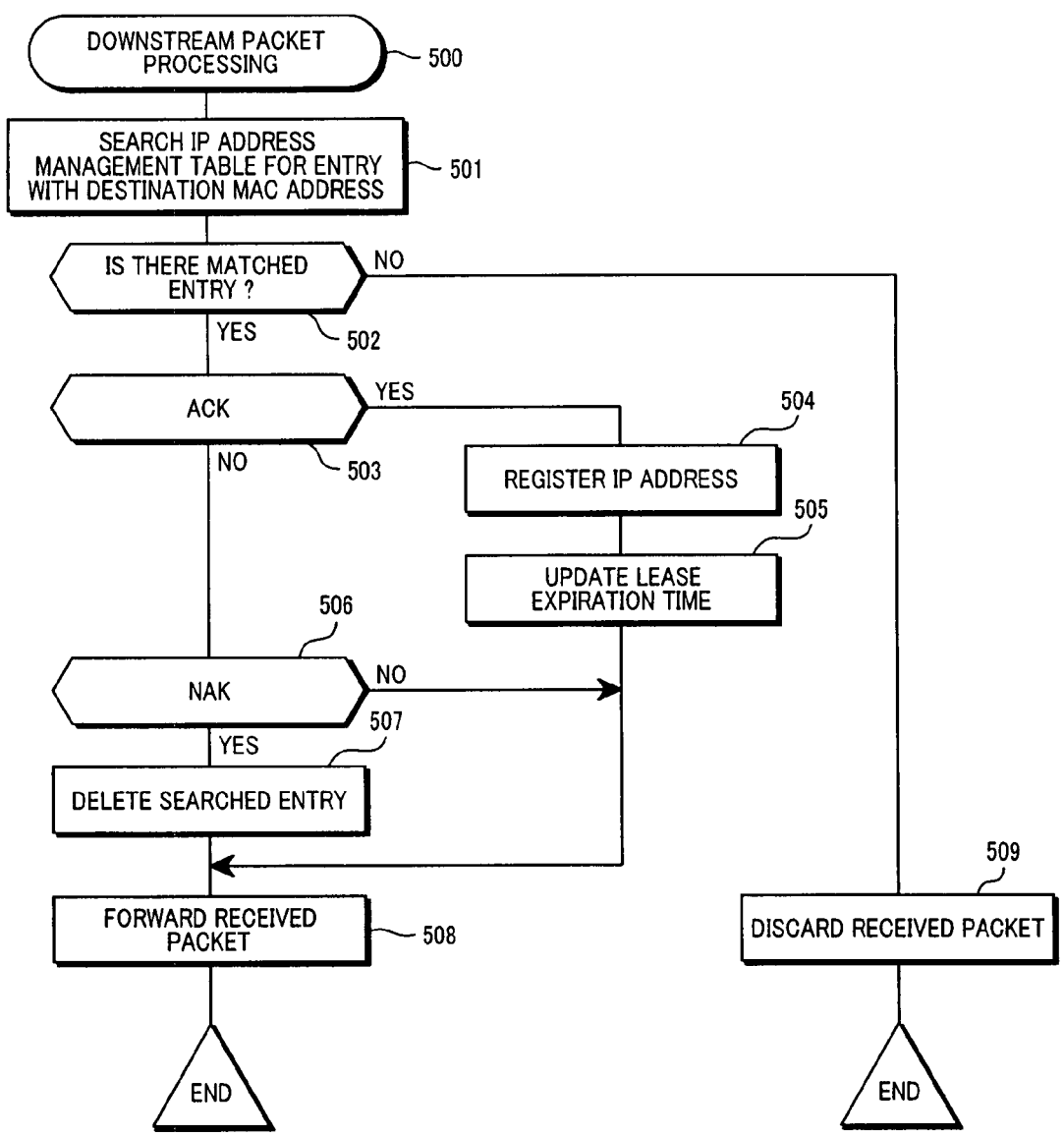
FIG. 17 is a flow chart of a downstream packet processing routine 500 to be executed in the L2SW 10 according to the second embodiment.

FIG. 17 shows a flow chart of the downstream packet processing routine 500.

The processor 11 of the L2SW 10 reads out a received packet from the input line interface 14-n connected to the router 32 and searches the IP address management table 70 for a table entry having the MAC address 71 matched with the source address of the received packet (Step 501). When no table entry corresponding to the destination MAC address was found as a result of table search (502), the processor 11 discards the received packet (509) and terminates the routine.

When the table entry corresponding to the destination MAC address was found, the processor 11 determines the type of the received packet. When the received packet is a DHCP ACK (Acknowledge) packet (503), the processor 11 registers the value of the assigned IP address indicated in the received DHCP ACK packet as the assigned IP address 73 in the table entry (504) and sets a value, obtained by adding the lease duration designated by the DHCP ACK packet to the current time, as the lease expiration time 74 of the table entry (505). Thereafter, the processor 11 forwards the received packet to one of the output line interfaces 15 corresponding to the destination MAC address of the received packet (508) and terminates the routine.

When the received packet is a DHCP NAK (Negative Acknowledge) packet (506), the processor 11 deletes the searched table entry from the IP address management table 70 (507), forwards the received packet to the output line interface 15 corresponding to the destination MAC address (508), and terminates the routine. When the received packet is a packet other than the DHCP ACK packet and the DHCP NAK packet, the processor 11 forwards the received packet to the output line interface 15 corresponding to the destination MAC address (508) and terminates the routine.

Figure 18:
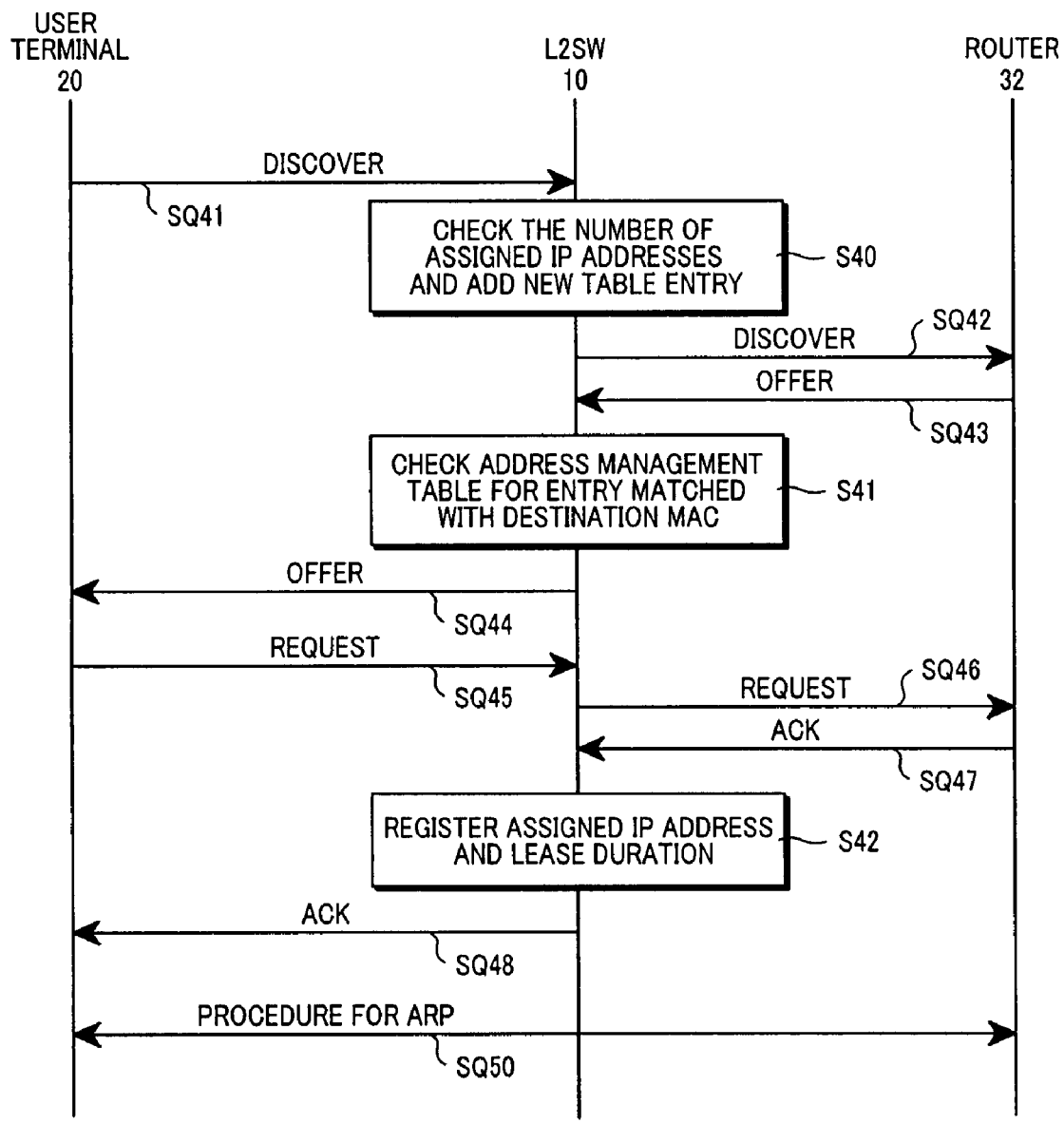
FIG. 18 shows a communication sequence for IP address assignment and the operation of the L2SW in the second embodiment.

FIG. 18 shows a communication sequence for IP address assignment to be executed between the user terminal 20 and the router (DHCP server) 32 via the L2SW 10 in the second embodiment.

Prior to an access to the Internet IPNW, the user terminal 20 transmits a DHCP DISCOVER packet to the router 32 (SQ 41). According to the upstream packet processing routine 400, the L2SW 10 having received the DHCP DISCOCER packet checks the number of assigned IP addresses by connection port by referring to the IP address management table 70, adds a new table entry to the IP address management table 70 if the number of assigned IP addresses has not reached a maximum value (S40), and forwards the received packet to the router 32 (SQ 42). If the number of assigned IP addresses has reached the maximum value, the user request is ignored and the received packet is discarded.

In response to the DHCP DISCOVER packet, the router 32 returns a DHCP OFFER packet (SQ43). The L2SW 10 having received the DHCP OFFER packet checks the IP address management table 70 to confirm that the table entry corresponding to the destination MAC address of the received packet has been already registered (S41) according to the downstream packet processing routine 500, and forwards the received packet to the user terminal 20 (SQ44).

The user terminal 20 having received the DHCP OFFER packet then transmits a DHCP REQUEST packet to the router 32 (SQ45). The DHCP REQUEST packet is forwarded by the L2SW 10 to the router 32 (SQ46), and the router 32 returns a DHCP ACK packet designating an assigned IP address and a lease duration in response to the DHCP REQUEST packet (SQ47). Upon receiving the DHCP ACK packet, the L2SW 10 checks the IP address management table for a table entry corresponding to the destination MAC address, registers the assigned IP address and the lease duration indicated in the received packet to the IP address management table (S42), and forwards the received packet to the user terminal 20 (SQ48).

Having been assigned the IP address with the DHCP ACK packet, the user terminal 20 inquires about the MAC address corresponding to the assigned IP address in accordance with the ARP protocol. After confirming that there is no user terminal having the same IP address other than itself (SQ50), the user terminal 20 starts communication with the Internet IPNW.

Figure 19:
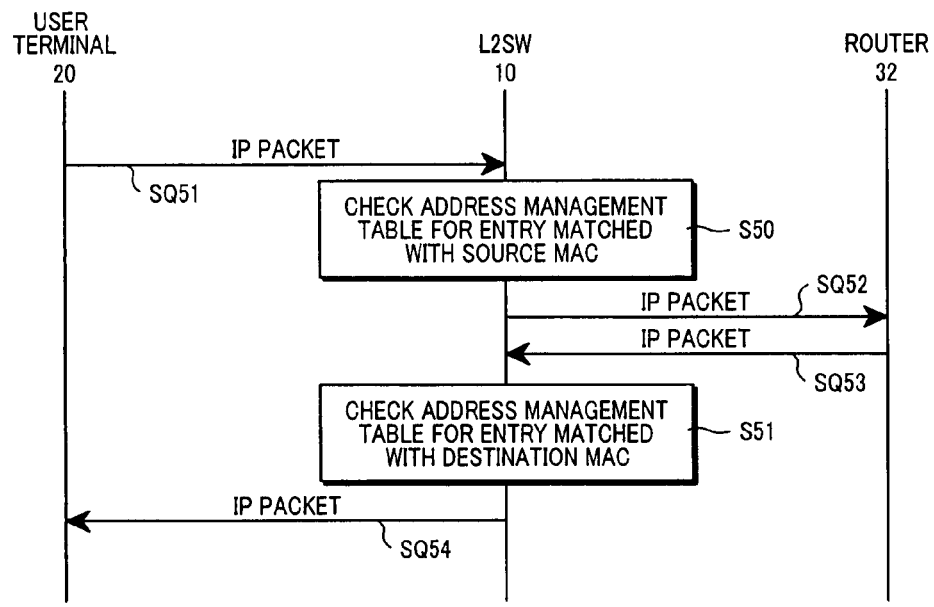
FIG. 19 shows a communication sequence for data packet transmission in the second embodiment.

FIG. 19 shows a communication sequence of a user IP packet (or ARP packet) in the second embodiment.

When the user terminal 20 transmits a user IP packet by applying the assigned IP address as the source IP address (SQ51), the L2SW 10 having received the user IP packet checks the IP address management table 70 (S50) according to the upstream packet processing routine 400. After confirming that a table entry corresponding to the source MAC address of the received packet has been already registered in the IP address management table 70, the L2SW 10 forwards the received packet to the router 32 (SQ52).

When the table entry corresponding to the source MAC address has not been registered in the IP address management table 70, the L2SW 10 (upstream packet processing routine 400) discards the received packet. Alternatively, the L2Sw 10 may forward the upstream received packet to the router 32 and discard a downstream packet received from the router in accordance with the downstream packet processing routine 500.

An IP packet transmitted from a server connected to the Internet IPNW, which is addressed to the user terminal 20, is forwarded to the L2SW 10 via the router 32 (SQ53). Upon receiving the IP packet, the L2SW 10 checks the IP address management table 70 (S51) according to the downstream processing routine 500. After confirming that a table entry corresponding to the destination MAC address of the received packet has been already registered in the IP address management table 70, the L2SW10 forwards the received packet to the user terminal 20 (SQ54). When the table entry corresponding to the destination MAC address has not been registered in the IP address management table 70, the L2SW 10 (downstream packet processing routine 500) discards the received packet.

Figure 20:
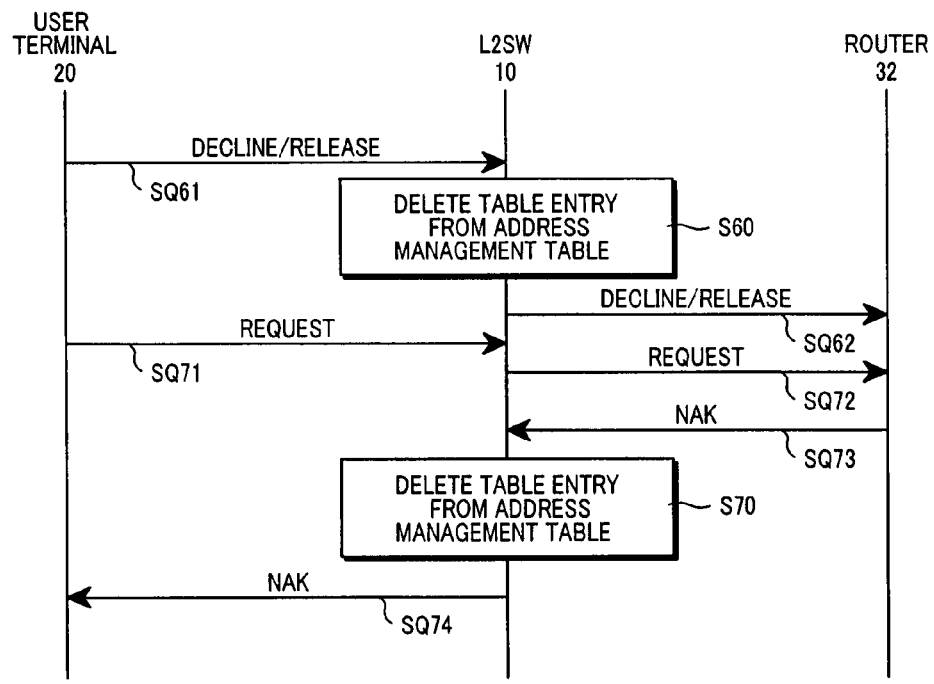
FIG. 20 shows a communication sequence for IP address release in the second embodiment.

FIG. 20 shows a communication sequence for IP address release performed between the user terminal 20 and the router (DHCP server) 32 via the L2SW 10 in the second embodiment.

When the user terminal 20 invalidates or releases the IP address assigned thereto, it transmits a DHCP DECLINE packet or a DHCP RELEASE packet addressed to the router 32 (SQ61). The DHCP DECLINE packet is a DHCP packet to be transmitted to invalidate the IP address assigned to the user terminal when it has been proved through the ARP procedure that the IP address is competitive with the IP address assigned to another user terminal. The DHCP RELEASE packet is a DHCP packet to be transmitted to release a normally assigned IP packet when it becomes unnecessary.

The L2SW 10 having received the DHCP packet mentioned above deletes, from the IP address management table 70 according to the upstream packet processing routine 400, the IP address i.e., a table entry corresponding to the source MAC address, requested to be released by the received packet (S60) and forwards the received packet to the router 32 (SQ62).

The deletion of the table entry from the IP address management table 70 is performed not only when the DHCP DECLINE packet or DHCP RELEASE packet mentioned above has been received but also when, e.g., the lease expiration time has been reached or a lease duration extension request from the user terminal has been rejected by the router 32.

For example, when the user terminal 20 transmits a lease duration extension request packet DHCP REQUEST (SQ71), the L2SW 10 executes the upstream packet processing routine 400 and forwards the received packet to the router 32 (SQ72). When the router 32 returns a DHCP NAK packet for rejecting the extension of the lease duration (SQ73), the L2SW 10 executes the downstream packet processing routine 500, deletes a table entry corresponding to the destination MAC address of the DHCP NAK packet from the IP address management table 70 (S70) and forwards the received DHCP NAK packet to the user terminal 20.

In the network configuration (FIG. 1 or FIG. 10) described as the embodiments, one packet forwarding apparatus (L2SW) 10 is connected to the management server (router having the function of a BAS or a DHCP server) of the ISP. However, in an actual situation, a plurality of packet forwarding apparatuses are connected to a management server so that the management server communicates a large number of user terminals via the plural packet forwarding apparatuses.

According to the embodiments of the present invention, since the packet forwarding apparatus (L2SW) 10 can alone limit the number of user terminals to be connected to the management server on a per access-line basis, it becomes possible to reduce the load on the management server.

In addition, the present invention can limit the number of user terminals to be connected to the Internet as a wide-area network without assuming the association with the management server of an ISP. This allows easy introduction of the packet forwarding apparatus according to the present invention into an existing network environment, and makes it possible to enhance resistance to an unauthorized DoS (Denial of Service) attack in which the same user issues large numbers of IP address assignment requests and session connection requests.

Although the line interface units of the L2SW are connected to different user networks via the individual access lines in the network configuration described as the embodiments, the present invention is also applicable to a network configuration in which a specific access line accommodated to a line interface unit is connected to a plurality of user networks via, e.g., another L2SW having the converting function between Port VLAN and Tag VLAN. In this case, since a plurality of Tag VLANs are brought into a multiplexed state in the specific access line, it becomes possible to limit the number of connected user terminals (the number of PPPoE sessions) on a per VLAN basis, for example, by applying a combination of a port ID and a VLAN-ID to the connection port ID of the specific access line in the PPPoE session management table 40 shown in FIG. 3.

Further, in the network configuration described as the embodiments, a single user terminal is connected to each of the access lines or a plurality of user terminals are connected to each of the access lines via the HUB. However, the present invention is also applicable, for example, to an L2SW provided on a PON (Passive Optical Network) which splits each of optical fibers connected to an OLT (Optical Line Terminal) into a plurality of branched optical fibers by using a splitter and communicates with user terminals connected to the individual branched optical fibers via ONUs (Optical Network Units). In the PON, the L2SW is disposed in the OLT so as to multiplex packets received from the user terminal via the branched optical fibers onto a connection line connected to a higher-order network.

What is claimed is:

1. A network system connecting a plurality of terminals with a wide-area network, the network system comprising:
    a packet forwarding apparatus for controlling packet forwarding between each of the terminals of the plurality of terminals and the wide-area network, the packet forwarding apparatus including a communication interface and a control unit,
    wherein the communication interface is configured to transmit control packets to and receive control packets from a management server that is configured to assign a specific header information item to be set in each packet sent from each terminal of the plurality of terminals to the wide-area network, and
    wherein the control unit is configured to determine whether a control packet received from a first terminal of the plurality of terminals for requesting assignment of a new specific header information item should be discarded or forwarded to the management server based on a quantity of specific header information items that have been assigned to packets sent from the first terminal.

2. The network system according to claim 1, wherein if the quantity of specific header information items that have been assigned to packets sent from the first terminal will exceed an upper limit value if the management server assigns the new specific header information item, the control unit operates to discard one of the control packet received from said one terminal or a control packet transmitted from the management server to said one terminal.

3. The network system according to claim 1, wherein control packets in accordance with a PPPoE (Point-to-Point Protocol over Ethernet) protocol are communicated between the first terminal and the management server, and wherein the control unit receives a PPPoE session identifier from the management server as the specific header information item to be set in each packet sent from each terminal of the plurality of terminals to the wide-area network.

4. The network system according to claim 1, wherein the control unit receives an IP address in accordance with DHCP (Dynamic Host Configuration Protocol) from the management server as the specific header information item to be set in each packet sent from each terminal of the plurality of terminals to the wide-area network.

5. The network system according to claim 1, wherein the control unit is configured to manage the specific header information item to be set in each packet sent from each terminal of the plurality of terminals to the wide-area network in a memory in association with a fixed address of said terminal.

6. The network system according to claim 5, wherein the fixed address of the first terminal is a MAC address.

7. The network system according to claim 5, wherein upon the control packet being received from the first terminal, the control unit determines whether the first terminal may obtain the new specific header information item based on the quantity of specific header information items that have been assigned to packets sent from the first terminal, retains the fixed address of the first terminal and forwards the control packet received from the first terminal to the management server upon determining that the first terminal may obtain the new specific header information item, and, upon receiving notification of the new specific header information item from the management server, stores a correspondence relationship between the new specific header information item and the fixed address of the first terminal in the memory.

8. The network system according to claim 7, wherein the correspondence relationship between the new specific header information item and the fixed address of the first terminal is stored in the memory in conjunction with time information indicating an expiration time of the new specific header information item, and
    wherein the control unit is configured to automatically delete from the memory any specific header information items determined to be expired in accordance with the time information and discard any received packets corresponding to any deleted specific header information items that include the fixed address of the first terminal as a source address or a destination address.

9. The network system according to claim 8, wherein the control unit is configured to update the time information that stored in the memory in conjunction with the fixed address upon receiving a packet that includes the fixed address as a source address or a destination.

10. The network system according to claim 3, wherein the control unit is configured to store the quantity of the specific header information items that have been assigned to packets sent from the first terminal in the memory, determine that a new PPPoE session connection request transmitted from the first terminal is not acceptable upon a quantity of PPPoE session identifiers assigned to the first terminal reaching a predetermined value, and discard control packets received from the first terminal during a PPPoE discovery stage upon the quantity of PPPoE session identifiers assigned to the first terminal reaching the predetermined value.

11. The network system according to claim 3, wherein the control unit is configured to store the quantity of the specific header information items that have been assigned to packets sent from the first terminal in the memory, determine that a new PPPoE session connection request from the first terminal is acceptable when a quantity of PPPoE session identifiers assigned to the first terminal being less a predetermined value, and forward PPPoE packets communicated between the first terminal and the management server when the quantity of PPPoE session identifiers assigned to the first terminal is less than the predetermined value.

* * * * *